United States Patent
Remias et al.

(10) Patent No.: US 9,675,928 B2
(45) Date of Patent: Jun. 13, 2017

(54) METHOD OF INHIBITING NITROSATION OF AN AQUEOUS AMINE SOLUTION USED IN A PROCESS OF REMOVING CARBON DIOXIDE FROM A FLUE GAS

(71) Applicant: University of Kentucky Research Foundation, Lexington, KY (US)

(72) Inventors: Joseph E. Remias, Woodbridge, VA (US); Payal Chandan, Bhiwandi (IN); Kunlei Liu, Lexington, KY (US)

(73) Assignee: THE UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 77 days.

(21) Appl. No.: 14/628,728

(22) Filed: Feb. 23, 2015

(65) Prior Publication Data

US 2015/0238894 A1    Aug. 27, 2015

Related U.S. Application Data

(60) Provisional application No. 61/944,232, filed on Feb. 25, 2014.

(51) Int. Cl.
| | |
|---|---|
| *B01D 53/62* | (2006.01) |
| *B01D 53/14* | (2006.01) |
| *C09K 15/04* | (2006.01) |
| *C09K 15/06* | (2006.01) |
| *C09K 15/10* | (2006.01) |
| *C09K 15/16* | (2006.01) |
| *C09K 15/18* | (2006.01) |
| *C09K 15/20* | (2006.01) |
| *C09K 15/26* | (2006.01) |
| *C09K 15/30* | (2006.01) |

(52) U.S. Cl.
CPC .... *B01D 53/1493* (2013.01); *B01D 2252/204* (2013.01); *B01D 2252/604* (2013.01); *Y02C 10/04* (2013.01); *Y02C 10/06* (2013.01)

(58) Field of Classification Search
None
See application file for complete search history.

(56) References Cited

U.S. PATENT DOCUMENTS

2005/0202967 A1*  9/2005  Hoefer ............... B01D 53/1493
                                                        502/401
2009/0205496 A1    8/2009  Idem et al.
(Continued)

FOREIGN PATENT DOCUMENTS

WO    WO2012/169634    * 12/2012    ............. B01D 53/14

OTHER PUBLICATIONS

ChemSpider, "Benzimidazole-2-thiol." (c)2015 Royal Society of Chemistry. Visited Aug. 10, 2016 at http://www.chemspider.com/Chemical-Structure.616466.html.*

(Continued)

*Primary Examiner* — Daniel Berns
(74) *Attorney, Agent, or Firm* — King & Schickli, PLLC

(57) ABSTRACT

A method is provided for inhibiting nitrosation of an aqueous amine solution used in a process of removing carbon dioxide from a flue gas. That method includes a step of adding an effective amount of an antioxidant to the aqueous amine solution being circulated between an absorber and a stripper of a carbon dioxide capture system.

9 Claims, 2 Drawing Sheets

(56) References Cited

U.S. PATENT DOCUMENTS

2013/0310623 A1* 11/2013 Siskin .................. C07C 7/11
                                                                   585/863
2014/0127119 A1* 5/2014 Fujimoto ........... B01D 53/1425
                                                                    423/437.1

OTHER PUBLICATIONS

Sotirios A Kyrtopoulos PhD, "Ascorbic acid and the formation of N-nitroso compounds: possible role of ascorbic acid in cancer prevention," ajcn.nutrition.org, AJCN 1987;45:1344-50.
Robert V. Cooney, et al, "N-Nitrosoamine and N-Nitroamine Formation: Factors Influencing the Aqueous Reactions of Nitrogen Dioxide with Morpholine," Environ. Sci. Technol. 1987, 21, 77-83.
Bharucha et al, "Ethoxyquin, Dihydroethoxyquin, and Analogues as Antinitrosamein Agents for Bacon," J. Agric. Food Chem. 1985, 33, 834-839.
Phil Jackson and Moetaz I. Attalla, "N-Nitrosopiperazines form at high pH in postcombustion capture solutions containing piperazine: a low-energy collisional behaviour study," Coal Portfolio, CSIRO Energy Technology, Oct. 7, 2010; Rapid Commun. Mass Spectrom, 2010; 24:3567-3577.

* cited by examiner

METHOD OF INHIBITING NITROSATION OF AN AQUEOUS AMINE SOLUTION USED IN A PROCESS OF REMOVING CARBON DIOXIDE FROM A FLUE GAS

This document claims benefit of U.S. Provisional Patent Application Ser. No. 61/944,232 filed Feb. 25, 2014, the full disclosure of which is incorporated herein by reference.

TECHNICAL FIELD

This document relates generally to carbon dioxide capture processes and, more particularly, to a method of nitrosation inhibition for aqueous amine solutions utilized in carbon dioxide capture processes.

BACKGROUND

The cleanup of acid gasses, such as $CO_2$, from natural gas has been an extensively practiced technology. The industrial removal of $CO_2$ from this natural gas dates back to the 1930's. While several technologies exist for the removal of acid gasses one of the most commonly employed practices is the use of aqueous amines. Post-combustion $CO_2$ capture is a newer area of interest, but the principles remain the same. The overall process is depicted in FIG. 1. An aqueous amine solution is circulated between the absorber 10 and stripper 12. The flue gas, containing $CO_2$, enters the bottom of the absorber 10 where it contacts the aqueous amine absorbent removing it from the gas stream. The liquid solution, $CO_2$ rich amine solution, is then passed through a heat exchanger 14 to improve efficiency before being heated to a higher temperature in the stripper 12. The stripper 12 removes the $CO_2$ as a gas from the amine solution to produce a lean, or $CO_2$ deficient solution. The lean solution is returned to the absorber 10 by way of the heat exchanger 14 to repeat the process. The $CO_2$ removed from the gas stream is then available for subsequent use such as Enhanced Oil Recovery (EOR), utilization in downstream products (polymers or chemicals), or for sequestration.

EOR currently represents the use of 54 MMT/y of $CO_2$ and is projected to grow by about 50% by the year 2020. Currently, the bulk of the $CO_2$ for EOR is naturally occurring with only about 20% of $CO_2$ used from anthropogenic sources. However, the key limitation to further deployment of EOR in the US is the supply of $CO_2$. There is increased motivation and interest in the use of post-combustion $CO_2$ to expand this market and debottleneck the $CO_2$ supply.

There are also other smaller potential post-combustion $CO_2$ capture markets. Examples include the production of food grade $CO_2$ (beverage carbonation) and sodium carbonate. There is also growing interest in the downstream utilization of $CO_2$ into value added products using post-combustion captured $CO_2$. The products include polycarbonates, urea, carboxylic acids, etc. These markets represent a shorter term market opportunity for the described process.

In the longer term $CO_2$ capture and sequestration (CCS) represents an enormous potential market for the described process. At present, the energy sector is responsible for about three-fourths of the anthropogenic carbon dioxide emissions. Over the past 15 years, economic activity in the U.S. has increased by about 50%; total U.S. electricity demand has increased 30% over the same period. In the coming years, the surge in the U.S. demand for electric power shows no signs of abating. Economic activity in the U.S. is projected to expand 49% by 2020. Accordingly, in the same period, the demand for electricity is projected to increase by another 30%. It is projected that fossil fuel combustion will still represent a large portion of the total US energy supply. The regulation or limitation on $CO_2$ emissions from fossil fuel combustion power plants would necessitate the large scale, commercial deployment of $CO_2$ capture and sequestration solutions as described above.

The actual process for $CO_2$ capture depicted in FIG. 1 is complicated by numerous factors, including the presence of oxidative contaminants in the flue gas in addition to the targeted $CO_2$. The flue gas contains various potential oxidants ($O_2$, $SO_x$, and $NO_x$) which can degrade the solvent. During the high temperature regeneration process, the components dissolved in the solution from the flue gas in the absorber at relatively low temperature can further degrade the solvent. Furthermore, the solvent can undergo thermal degradation to yield more impurities potentially subject to degradation.

One of the critical degradation paths is the reaction of $NO_x$ with amine solvents to generate nitrosamines and nitramines. These compounds are of particular interest due to their potential for secondary environmental impact if released to the environment (as a gas or in liquid phase). The utilization of process methods to reduce nitrosation products is thus valuable for amine-based $CO_2$ capture.

Chemical additives provide one possible route to reducing nitrosation. The additive or inhibitor presumably works by reacting with the active radical species to prevent the reaction with the amine. Due to the low concentration of active radical species in solution the compound is needed in only small concentration to effectively inhibit the nitrosation reaction.

SUMMARY

In accordance with the purposes and benefits described herein, a method is provided for inhibiting nitrosation of an aqueous amine solution used in a process of removing carbon dioxide from a flue gas. The method may be broadly described as comprising the step of adding an effective amount of antioxidant to the aqueous amine solution being circulated between an absorber and a stripper of a carbon dioxide capture system whereby carbon dioxide is removed from the flue gas and formation of undesirable nitrosamines and nitramines is inhibited. In one possible embodiment, the method includes maintaining the antioxidant at a concentration of between about 0.01 mM to about 1,000 mM in the aqueous amine solution. In accordance with an alternative embodiment, the method includes the step of maintaining the antioxidant at a concentration of between about 0.1 mM to about 100 mM in the aqueous amine solution.

In one possible embodiment, the antioxidant is a food preservative. In another possible embodiment, the antioxidant is a nitrogen containing heterocycle. In yet another possible embodiment, the antioxidant is a sulfur containing heterocycle. In still another possible embodiment, the antioxidant includes a thiol group. In other embodiments, the antioxidant is selected from a group of compounds consisting of vanillin, vitamin D, ascorbic acid, erythorbic acid, ethoxyquin, triphenylmethylmercaptan, 2-mercaptobenzthiazole, methylmercaptobenzimidazole, 2,5-dimercapto1,3,5-thiodiazole, 2-mercaptobenzimidazole, and combinations thereof.

In the following description, there are shown and described several preferred embodiments of the method. As it should be realized, the method is capable of other, different embodiments and its several details are capable of modification in various, obvious aspects all without departing from the method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the method and together with the description serve to explain certain principles thereof. In the drawing figures.

Figure 1:
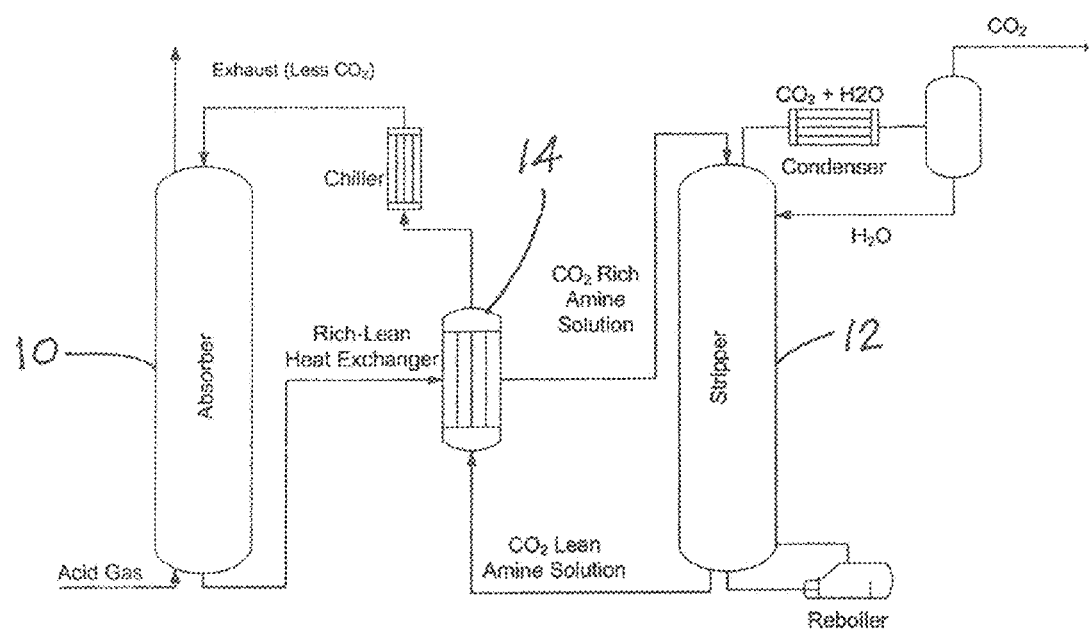
FIG. 1 is a schematic illustration of a process for removing acid gas, such as carbon dioxide, from a flue gas utilizing an aqueous amine solvent and thermal swing regeneration.

Reference will now be made in detail to the present preferred embodiments of the method, examples of which are illustrated in the accompanying drawing figures.

DETAILED DESCRIPTION

For amine-based $CO_2$ capture, the presence of dissolved oxides of nitrogen has the potential to act as a nitrosating agent for reaction with secondary amines. Such reactions can lead to the formation of nitrosamines, which are potential undesired environmental pollutants. The present method relates to inhibiting $NO_x$ induced amine degradation during carbon dioxide ($CO_2$) capture from a gas stream. The inhibitor is completely or partially soluble in the $CO_2$ capture solution. The inhibitor is a chemical additive that presumably reacts with the $NO_x$ derived species and prevents the undesirable reaction with the amine. More specifically, the chemical additive presumably reacts with the radical species present in the solution from the dissolved $NO_x$ compounds present in the flue gas contacting the amine. The inhibitor is replenished in a $CO_2$ capture process as needed by adding more to the solution. The inhibitor concentration could be monitored in the process using either online or offline process quality control methods.

The described method is relevant to any post-combustion $CO_2$ capture process that utilizes amines. The method is specifically relevant to the use of secondary amines ($R_2NH$) as the amine solvent since secondary amines form stable nitrosation by-products. Secondary amines are particularly relevant to post-combustion $CO_2$ capture as they are characterized by fast reaction rate (important at low driving force such as this) and lower energy of regeneration. Furthermore, the method can be applied to any amine based post-combustion process since the degradation pathways due to the process conditions of primary ($RNH_2$) and tertiary ($R_3N$) amines can lead to secondary amines. Typical secondary amines used for $CO_2$ capture are, piperazine, diethanolamine, morpholine and/or mixture thereof. Depending on the amine solution used the amine concentrations are between 15 and 70 wt % with the balance typically as water.

In the broadest sense the additives for the process can be characterized as antioxidants. However, as shown in the examples certain types of compounds are more effective at inhibition than others. The most effective inhibitors are characterized by the presence of a heteroatom (N, S, or O) within an aromatic ring. The most advantageous materials for the process are typically N containing heterocycles and/or thiol groups. It has been found that the presence of these compounds can serve a triple active role in simultaneously reducing nitrosation, oxidation, and corrosion. For example, of particular interest for the invention are the compounds 2-mercaptobenzthiazole, 2-mercapto 1-methyl benzimidazole, 2,5-dimercapto1,3,5-thiodiazole, and 2-mercaptobenzimidazole.

The amount of inhibitor added to the $CO_2$ capture solvent can vary depending on the solvent selected, the secondary amine products formed in degradation (if not present originally), process temperatures, and the amount of $NO_x$ compounds in the flue gas. A typical amount of inhibitor would be between 0.1 mM to 100 mM. It is possible that ranges from 0.01 mM to 1000 mM could be used.

The inhibitors used in the present method maintain their activity for inhibiting nitrosation reaction at the elevated temperatures applied in typical $CO_2$ capture process. This temperature is typically between 30-60° C. for scrubber and 100-160° C. for stripper.

The advantage of the method is to prevent the nitrosation reaction presumably by increasing the rate of the competing reaction with inhibitor or by preventing the radical reaction of the nitrosating agent with amine. The prevention of the nitrosation reaction significantly reduces or eliminates potentially detrimental emissions into the environment for this reaction.

A secondary benefit of the proposed inhibitors is that they can potentially prevent the degradation of amine solvent via other degradation pathways reducing amine degradation loss during the process which helps in process cost reduction.

Consistent with this description, the current method may be broadly described as comprising the step of adding an effective amount of antioxidant to the aqueous amine solution being circulated between an absorber and a stripper of a carbon dioxide capture system. As a result, the carbon dioxide is removed from the flue gas and formation of undesirable nitrosamines and nitramines is inhibited.

The method may include the step of maintaining the antioxidant at a concentration of between about 0.01 mM to about 1000 mM in the aqueous amine solution. In another possible embodiment, the method includes the step of maintaining the antioxidant at a concentration of between about 0.1 mM to about 100 mM in the aqueous amine solution.

The antioxidant utilized in the method may be a food preservative. In one useful embodiment, the antioxidant is a nitrogen containing heterocycle. In another useful embodiment, the antioxidant is a sulfur containing heterocycle. In still another useful embodiment, the antioxidant includes a thiol group.

Specific antioxidants used in the current method include, but are not limited to, vanillin, vitamin D, ascorbic acid, erythorbic acid, ethoxyquin, triphenylmethylmercaptan, 2-mercaptobenzthiazole, methylmercaptobenzimidazole, 2,5-dimercapto 1,3,5-thiodiazole, and 2-mercaptobenzimidazole. Any of the classes or specific antioxidants identified above may be used individually or in combination in the current method for inhibiting nitrosation of an aqueous amine solution or solvent used in a process of removing carbon dioxide from the flue gas.

While numerous potential methods for practicing the invention could be described an example is given. An EOR facility requires $CO_2$ delivered to extend the extraction efficiency of a well. An amine based $CO_2$ scrubber is constructed at a nearby coal-fired power plant to capture a slipstream of the product flue gas. An aqueous diethanolamine solution is used to capture the $CO_2$. The flue gas from the power plant, despite $NO_x$ reduction using selective catalytic reduction, contains 100 ppm of NO$_x$ species. Nitrosodiethanolamine, a regulated compound, and other nitroso compounds are monitored using analytical methods in the amine solvent and the absorber gaseous emissions. An inhibitor/additive such as 2-mercaptobenzthiazole is dosed into the liquid process stream to bring nitroso compound generation below a predefined limit. The concentration of the additive is also monitored and a makeup amount is dosed as needed.

The following examples are presented to further illustrate but not limit the current method as set forth and described in the following claims:

EXPERIMENTAL

For laboratory tests, the reactions are conducted in a 100 mL 4-necked round bottom flask fitted with a condenser at the gas outlet. The apparatus is immersed in an oil bath for heating control (±2° C.). A K-type thermocouple is immersed in the solution to maintain the required temperature. The outgoing gas is purged into 2.5 M KOH bath to trap the NO$_x$ based components before connecting to the hood vent stack. 100 ppm NO$_2$ gas cylinder is purchased from Scott-Gross. The incoming gas from the cylinder is passed into the reactor medium with specified flow rate using a flow meter (0.4-2 SCFH).

For the high temperature studies, a solution containing amine solvent and sodium nitrite are placed in a stainless steel pressure rated reactor. These reactors are kept at the desired temperature in ovens and are taken out at regular time intervals from the ovens. Similar experiments are conducted with the solution containing inhibitor.

The known amounts of samples are collected at periodic time intervals from each reaction. These samples are extracted in methylene chloride to analyze the organic layer by GC-MS for nitrosamine quantification. Nitrosopyrrolidone is used as an internal standard.

Examples 1-11

Experiments with NO$_2$ Gas

For a standard reaction, 100 mL of 5 M morpholine is taken into the flask. Inhibitor (5 mM) is added to the solution. The temperature is maintained at 30° C. 100 ppm NO$_2$ gas in nitrogen is passed through the solution at the flow rate of 2 SCFH for 6 h. The inhibition activity of the different studied inhibitors is calculated based on the blank run (Example 7) as summarized in Table 1.

TABLE 1

Effect of nitrosation inhibitors with NO$_2$ gas

| Example | Inhibitor | Amount of Nitrosomorpholine (µg/g) | Inhibition activity (%) |
|---|---|---|---|
| 1. | No Inhibitor | 88 | — |
| 2. | Vanillin | 54 | 39 |
| 3. | Vitamin E | 47 | 46 |
| 4. | Triphenylmethylmercaptan | 38.3 | 56 |
| 5. | 2-mercaptobenzothiazole | 15 | 83 |
| 6. | Ascorbic acid | 14 | 84 |
| 7. | Erythorbic acid | 12 | 86 |
| 8. | 2-mercapto-1-methylimidazole | 12.4 | 86 |

TABLE 1-continued

Effect of nitrosation inhibitors with NO$_2$ gas

| Example | Inhibitor | Amount of Nitrosomorpholine (µg/g) | Inhibition activity (%) |
|---|---|---|---|
| 9. | 2,5-dimercapto 1,3,4-thiodiazole | 9.8 | 89 |
| 10. | 2-Mercaptobenzimidazole | 8.9 | 94 |
| 11. | Ethoxyquin | 4 | 95 |

Experimental conditions: Morpholine 5M, NO$_2$ 100 ppm with flow rate 2 SCFH, 30° C., 6 h, inhibitor 5 mM Example 12-17

Experiments with Sodium Nitrite at High Temperature

Figure 2:
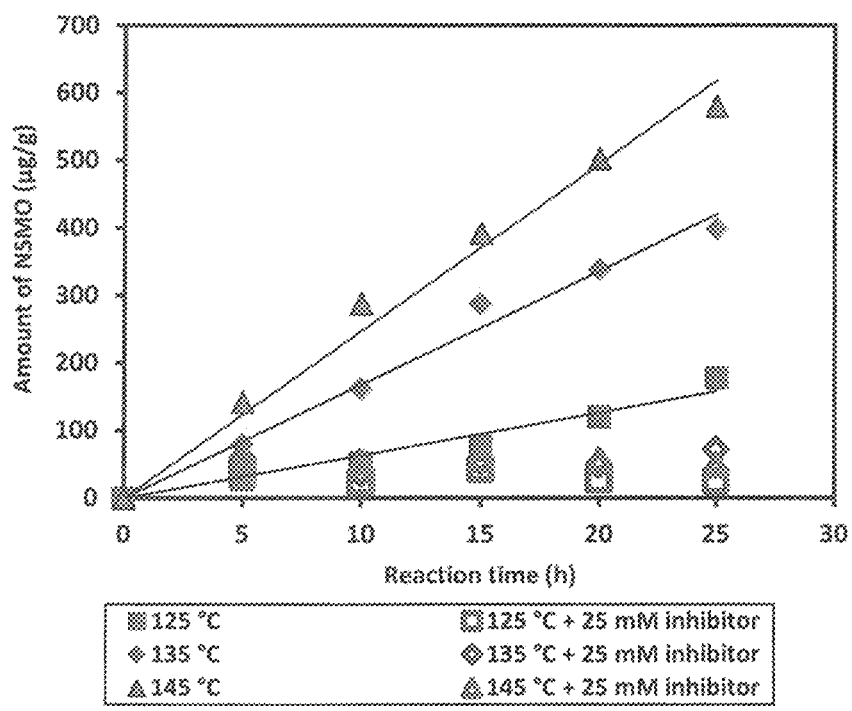
FIG. 2 is a graph of amount of nitrosomorpholine (NSMO) versus reaction time illustrating inhibitor evaluation for morpholine nitrosation under reaction conditions: 5 M morpholine, 100 ppm sodium nitrite, 25 mM isoascorbic acid, 25 hours.

The reactions are conducted in 10 mL stainless steel reactors. The reactor was filled with 4 mL 5 M morpholine solution and 1000 ppm sodium nitrite. 25 mM erythorbic acid was added as inhibitor. The reactor was placed in a thermostatic oven at the temperature mentioned in Table 2. The inhibitor was found active and stable even at high temperature (FIG. 2).

TABLE 2

Inhibitor quantity and different temperatures

| Example | Inhibitor quantity (mM) | Temperature (° C.) |
|---|---|---|
| 12 | 0 | 125 |
| 13 | 0 | 135 |
| 14 | 0 | 145 |
| 15 | 25 | 125 |
| 16 | 25 | 135 |
| 17 | 25 | 145 |

Experimental conditions: Morpholine 5M, sodium nitrite 1000 ppm, 25 h

Example 18-23

Inhibition with Different Amines

In the reaction vessel, 100 mL of 5 M solvent was charged. Erythorbic acid 5 mM was added as an inhibitor to it. The temperature was maintained at 30° C. 100 ppm NO$_2$ gas in nitrogen was passed through the solution at the flow rate of 2 SCFH for 6 h. The inhibition activity of erythorbicacid with different amines is summarized in Table 3.

TABLE 3

Nitrosation inhibition with isoascorbic acid over different amines

| Example | Amine | Inhibitor (mM) | Amount of Nitrosomorpholine (µg/g) | Inhibition activity (%) |
|---|---|---|---|---|
| 18 | Morpholine | 0 | 88 | — |
| 19 | Morpholine | 25 | 12 | 86 |
| 20 | Diethanolamine | 0 | 68 | — |
| 21 | Diethanolamine | 25 | 7 | 90 |
| 22 | Piperazine | 0 | 78 | — |
| 23 | Piperazine | 25 | 34 | 56 |

Experimental conditions: Amine 5M, NO$_2$ 100 ppm with flow rate 2 SCFH, 30° C., 6 h, inhibitor

Example 24-31

Demonstration of Multi-Use Inhibition

Table 4 shows the ability of various amines to inhibit the oxidation. Specifically, a solution of the common $CO_2$ capture amine MEA were exposed to air and $CO_2$ mixture at accelerated high temperature conditions for 100 h. It was found that the inhibitors containing both a N-containing 5 or 6 membered ring and a thiol group were most effective at inhibiting MEA oxidation to formate.

TABLE 4

Inhibitors tested for oxidative degradation and their activity

| # | Inhibitors screened | % formate inhibition |
|---|---|---|
| 24 | 2,5-dimercapto-1,3,4-thiodiazole | 100 |
| 25 | 2-mercapto-1-methyl imidazole | 100 |
| 26 | 2-mercaptobenzothiazole | 100 |
| 27 | sodium sulfide | 64 |
| 28 | alpha-toluenethiol | 76 |
| 29 | Triphenylmethyl mercaptan | 78 |
| 30 | benzyl sulfide | 0 |
| 31 | 2-mercaptobenzimidazole | 100 |

Experimental conditions: 5M MEA, 25% $CO_2$ + 75% air, 80° C., 5 mM inhibitor

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of inhibiting nitrosation of an aqueous amine solution used in a process of removing carbon dioxide from a flue gas, comprising:
    adding an effective amount of an antioxidant to the aqueous amine solution being circulated between an absorber and a stripper of a carbon dioxide capture system whereby carbon dioxide is removed from flue gas and formation of undesirable nitrosamines and nitramines is inhibited, wherein the antioxidant is selected from the group consisting of vanillin, vitamin D, erythorbic acid, triphenylmethylmercaptan, 2-mercapto 1-methyl benzimidazole and 2,5-dimercapto 1,3,5-thiodiazole.

2. The method of claim 1, including maintaining said antioxidant at a concentration of between about 0.01 mM to about 1,000 mM in said aqueous amine solution.

3. The method of claim 1, including maintaining said antioxidant at a concentration of between about 0.1 mM to about 100 mM in said aqueous amine solution.

4. The method of claim 1, wherein said antioxidant includes a is vanillin.

5. The method of claim 1, wherein said antioxidant is vitamin D.

6. The method of claim 1, wherein said antioxidant is erythorbic acid.

7. The method of claim 1, wherein said antioxidant is triphenylmethylmercaptan.

8. The method of claim 1, wherein said antioxidant is 2-mercapto 1-methyl benzimidazole.

9. The method of claim 1, wherein said antioxidant is 2,5-dimercapto 1,3,5-thiodiazole.

* * * * *